United States Patent
Möller et al.

(10) Patent No.: US 6,484,684 B2
(45) Date of Patent: Nov. 26, 2002

(54) CRANKSHAFT ROTATIONAL SUPPORT ARRANGEMENT FOR AN INTERNAL COMBUSTION ENGINE

(75) Inventors: Heribert Möller, Sachsen (DE); Josef Winter, Rednitzhembach (DE)

(73) Assignee: MAN Nutzfahrzeuge AG (DE)

( * ) Notice: Subject to any disclaimer, the term of this patent is extended or adjusted under 35 U.S.C. 154(b) by 0 days.

(21) Appl. No.: 09/861,161

(22) Filed: May 17, 2001

(65) Prior Publication Data

US 2001/0042533 A1 Nov. 22, 2001

(30) Foreign Application Priority Data

May 17, 2000 (DE) .......................................... 100 24 217

(51) Int. Cl.$^7$ .................................................. F02F 7/00
(52) U.S. Cl. ................ 123/195 R; 123/195 H
(58) Field of Search ........................... 123/195 R, 195 H

(56) References Cited

U.S. PATENT DOCUMENTS 6,135,081 A * 10/2000 Eidenboeck et al. ..... 123/195 A

* cited by examiner

Primary Examiner—Noah P. Kamen
(74) Attorney, Agent, or Firm—R W Becker & Associates; R W Becker

(57) ABSTRACT

A crankshaft rotational support for an internal combustion engine having a crankshaft supported by rotational support elements spaced from one another along the longitudinal direction of the internal combustion engine is provided. The crankshaft rotational support includes a plurality of bearing blocks and a plurality of bearing covers. Stiffening elements extend longitudinally for interconnecting H-shaped side projections of the bearing covers to one another. The bearing blocks, the bearing covers, and the stiffening elements collectively form a unit which is cast as an integral unit during a casting process with the cast bearing covers and the cast bearing blocks being separable from one another along a break line. The side projections and the stiffening elements each have an open profile that does not comprise any fully encircled apertures in which a casting sand core may remain after casting.

2 Claims, 2 Drawing Sheets

CRANKSHAFT ROTATIONAL SUPPORT ARRANGEMENT FOR AN INTERNAL COMBUSTION ENGINE

BACKGROUND OF THE INVENTION

The present invention relates to a crankshaft rotational support arrangement for an internal combustion engine.

EP 885 354 B1 discloses a crankshaft rotational support arrangement by which the crankshaft is rotatably supported by bearings arranged in a spaced manner from one another. The bushings are arranged between the bearing blocks and the bearing covers. A bearing cover and a bearing block together form a single castable unit. Moreover, the bearing cover is provided with side extending projections which are connected by stiffening elements to one another along the longitudinal extent of the motor on both sides of the crankshaft. Bearing blocks, bearing covers, and the stiffening elements initially form a unit for casting purposes. To effect the installation of the bushings, the bearing blocks and the bearing covers are separated from one another out of the cast unit by separation along separation interfaces lying in a diametrical plane of the crankshaft. The bearing blocks, the bearing covers, and the stiffening elements are cast as hollow items as a consequence of which it is necessary in the casting of each such component that a core be formed which must subsequently be removed, after the casting operation, through the various openings present in the cast unit. It can be readily appreciated that the removal of these cores engenders a relatively high work effort. The hollow apertures which remain after the removal of the casting cores therefrom can be used, to be sure, as guide paths for lubrication oil but, in such event, all openings used for the removal of the casting material must be closed in a relatively time consuming work process and even the slightest traces of casting sand, if not removed, will be entrained in the lubrication oil circuit and will necessarily lead to severe motor damage.

SUMMARY OF THE INVENTION

The present invention provides a bending resistant arrangement of the bearing blocks and the bearing covers of a crankshaft rotational support which can be fabricated with a relatively low work effort.

A high stiffness, or resistance to bending, is achieved with the arrangement of the present invention by the use of side projections of the bearing blocks, which have open profiles as viewed in section, and side stiffening elements, without necessitating an unfavorably large work effort to clear casting material from the cast crankshaft rotational support.

The use of side projections having an H-shaped profile provides good stiffness with respect to the main axes of the projections and, at the same time, permits easy removal of the casting sand following the casting process.

BRIEF DESCRIPTION OF THE DRAWINGS

This object, and other objects and advantages of the present invention, will appear more clearly from the following specification in conjunction with the accompanying schematic drawings, in which.

DETAILED DESCRIPTION OF THE PREFERRED EMBODIMENT

Figure 1:
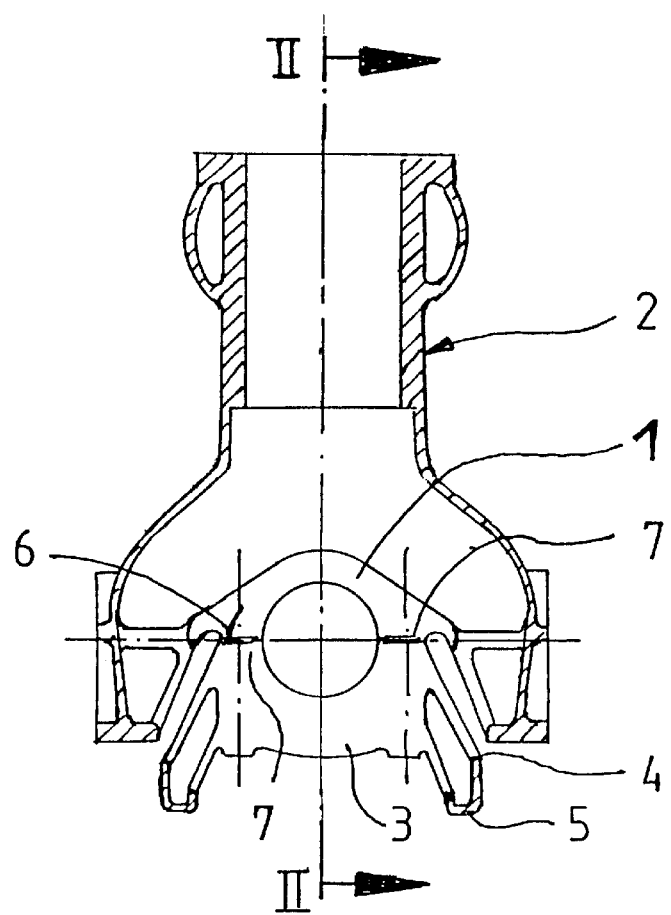
FIG. 1 is a sectional view of an internal combustion engine having a crankshaft rotational support arrangement comprising bearing blocks and bearing covers.

FIG. 1 is a sectional view through a crankcase in the area thereof in which a bearing block 1 is located. The bearing block 1 and the crankcase 2 form a conventional casting unit which is cast as an integral unit during a casting process. In accordance with the present invention, however, a bearing cover 3 is also cast together with the bearing block 1. Side projections 4 are provided to stiffen, or improve the bending resistance of, the bearing cover 3. The side projections 4 are, in turn, connected to one another in the longitudinal direction of the internal combustion engine by stiffening elements 5. The stiffening elements 5 are formed so as to have a U-shaped sectional profile, whereby these elements have a high stiffness. In view of the fact that the stiffening elements 5 are formed with open profiles which do not comprise any fully encircled apertures, the casting sand used to cast these elements can be relatively easily removed after the casting process. The projections 4 are formed with a profile so as to impart to each side projection a relatively high stiffness or resistance to bending relative to its relatively low weight. Due to the arrangement of the crankshaft rotational support in a partitioned configuration, the bearing cover 3 is separated from the bearing block 1 by breaking off the two components from one another at a diametrical plane 6 of the crankshaft. Notches 7 are provided for the breaking off of the bearing cover 3 from the bearing block 1.

Figure 2:
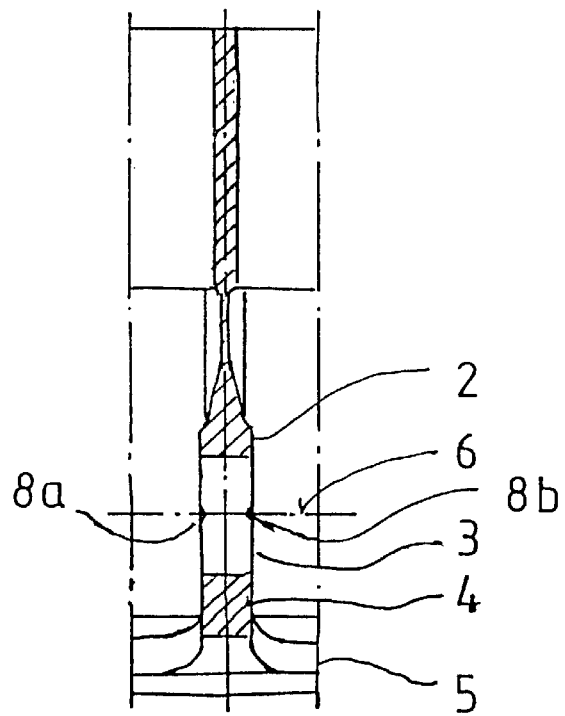
FIG. 2 is an enlarged sectional view of a bearing cover having stiffening elements as taken along line II—II of FIG. 1.

FIG. 2 shows an enlarged sectional view of the bearing cover taken along line II—II of FIG. 1 through another diametrical plane of the crankshaft. Notches 8a, 8b are provided between the bearing block 1 and the bearing cover 3 in the diametrical plane 6 in order to permit a separation of the bearing block and the bearing cover from one another along a predetermined break line. As can also be seen in FIG. 4, the bearing covers 3 additionally include side projections 4 which are interconnected by stiffening elements 5 extending in the longitudinal direction of the engine to form therewith a unit which is cast as an integral unit during a casting process.

Figure 3:
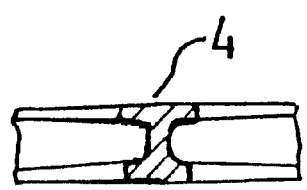
FIG. 3 is an enlarged sectional view through a side projection of the bearing cover taken along line III—III.

The profiled configuration of one of the side projections 4 is shown in section in FIG. 3. The illustrated side projection 4 has an H-shaped profile which, due to its open geometry, permits easy removal of the casting sand used in the casting of the side projection. The H-shaped profile of the side projection 4 nonetheless ensures high stiffness or resistance to bending in the longitudinal direction of the engine and the transverse direction perpendicular to the longitudinal direction.

Figure 4:
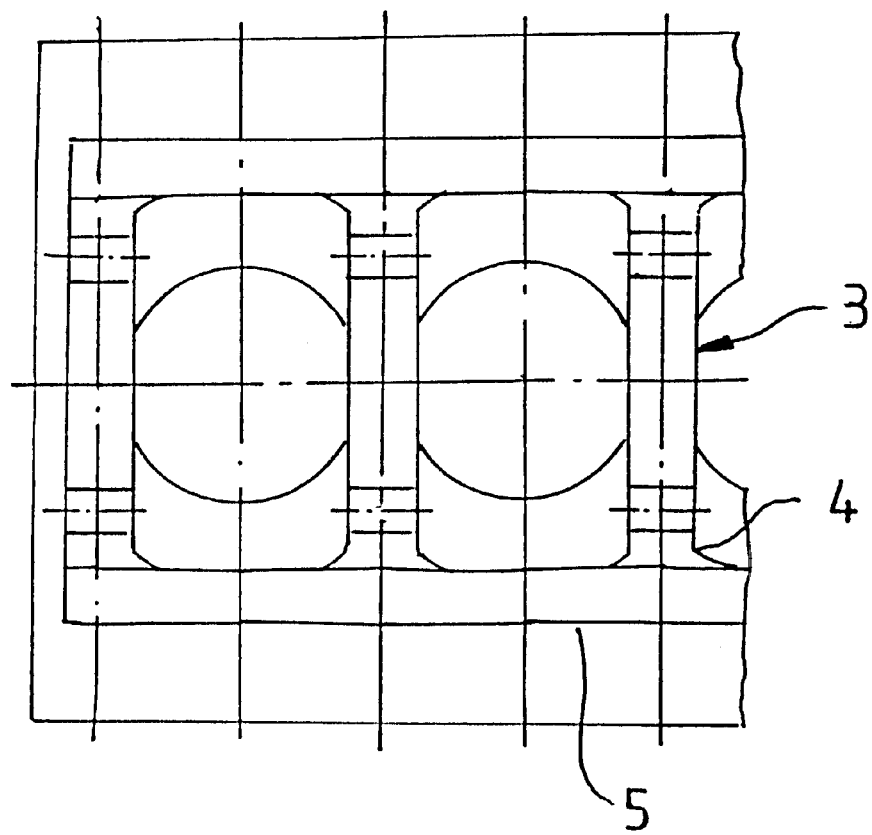
FIG. 4 is a bottom plan view from the perspective of the oil pan of a portion of the ladder-type crankcase frame comprised of bearing covers and stiffening elements.

FIG. 4 shows a view of the crankcase from the perspective of the oil pan at the bottom thereof. The stiffening elements 5 interconnect the side projections 4 of the bearing covers 3 to thereby form a very high stiffness, ladder-type frame. As both the profiles of the side projections 4 (see FIG. 3) and the profiles of the stiffening elements 5 (see FIG. 1) are open and, therefore, do not comprise any fully encircled apertures in which a casting sand core may remain after casting, the casting sand can be very easily removed after the casting of the unit without requiring labor intensive and, thus, cost additive follow up work.

The specification incorporates by reference the disclosure of German priority document 100 24 217.0 of May 17, 2000.

The present invention is, of course, in no way restricted to the specific disclosure of the specification and drawings, but also encompasses any modifications within the scope of the appended claims.

What we claim is:

1. A crankshaft rotational support for an internal combustion engine having a crankshaft supported by rotational support elements spaced from one another along the longitudinal direction of the internal combustion engine, comprising:

a plurality of bearing blocks;

a plurality of bearing covers, each bearing cover being associated with a bearing block for cooperatively supporting a bushing which rotatably supports the crankshaft and each bearing cover having side projections extending transversely to each lateral side of the bearing cover perpendicular to the longitudinal direction of the engine; and a plurality of stiffening elements extending longitudinally for interconnecting the side projections of the bearing covers to one another, the bearing blocks, the bearing covers, and the stiffening elements collectively forming a unit which is cast as an integral unit during a casting process and the cast bearing covers and the cast bearing blocks being separable from one another along a break line lying in a diametrical plane of the crankshaft after the casting process and being subsequently re-attachable to one another in the assembled condition of the internal combustion engine, and the side projections and the stiffening elements each having an open profile that does not comprise any fully encircled apertures in which a casting sand core may remain after casting.

2. A crankshaft rotational support according to claim 1, wherein the side projections have a generally H-shaped profile and the stiffening elements have a generally U-shaped profile, whereby the profiles of each of the side projections and the stiffening elements are open profiles.

* * * * *